United States Patent [19]

Tabata et al.

[11] 4,375,690
[45] Mar. 1, 1983

[54] MULTI-PHASE SILENT DISCHARGE GAS LASER APPARATUS

[75] Inventors: Norikazu Tabata; Shigenori Yagi; Takanori Ueno; Shuji Ogawa, all of Amagasaki, Japan

[73] Assignee: Mitsubishi Denki Kabushiki Kaisha, Tokyo, Japan

[21] Appl. No.: 206,606

[22] Filed: Nov. 13, 1980

[30] Foreign Application Priority Data

Nov. 21, 1979 [JP] Japan ................................ 54-150891

[51] Int. Cl.³ .............................................. H01S 3/09
[52] U.S. Cl. .................................. 372/82; 372/85; 372/88
[58] Field of Search ................... 372/81, 82, 85, 87, 372/88, 35

[56] References Cited

FOREIGN PATENT DOCUMENTS 54-24591 2/1979 Japan ...................................... 372/85

OTHER PUBLICATIONS

Yagi et al, "Silent Discharge $CO_2$ Laser", *Laser Kenkyu*, Dec. 1977, pp. 39–44.
R. D. Reid et al., "Three Phase Excitation of a Hollow Cathode Laser", *Quantum Electronics Letters*, vol. QE-16, No. 1, Jan. 1980, pp. 3–4.

*Primary Examiner*—James W. Davie
*Attorney, Agent, or Firm*—Sughrue, Mion, Zinn, Macpeak and Seas

[57] ABSTRACT

A silent discharge gas laser apparatus has three or more electrodes arranged in axial symmetry with the laser radiation axis and supplied with voltage from a multiphase high frequency power source to establish a continuous discharge and a higher discharge density at reduced frequencies, particularly in the central region of the discharge zone.

11 Claims, 9 Drawing Figures

MULTI-PHASE SILENT DISCHARGE GAS LASER APPARATUS

BACKGROUND OF THE INVENTION

1. Field of the Invention

This invention relates to an improved silent discharge type of gas laser apparatus.

2. Description of the Prior Art

FIG. 1 shows a vertical cross-sectional view of a conventional silent discharge type gas laser apparatus, in which the gas flows in parallel with an axis of the laser radiation. The operation of this laser apparatus will be described using a $CO_2$ gas laser as an example.

A gas mixture of $CO_2$, $N_2$ and He is fed into a discharge tube 1 made of dielectric materials at a pressure of 100 torr and is circulated in the direction of arrows A by a blower 9. A signal having a frequency from 20 or 30 KHz to several hundred KHz and a voltage of several KV is applied across electrodes 2-1 and 2-2 from a power source 4 to form a discharge in the tube 1. This discharge takes place between the two electrodes disposed on the dielectric wall of the tube, and is called "silent discharge".

The $CO_2$ molecules in the gas are excited by the discharge and laser oscillation is established in a resonator including a total reflector 5 and a partial reflector 6; laser radiation is primarily emitted through the partial reflector 6 as shown by an arrow B. If the discharge causes the temperature of the gas to rise beyond a predetermined limit, the laser oscillation becomes difficult or impossible to maintain. Accordingly, the gas is circulated by the blower 9 in the direction of the arrows through ducts 7 and 8 and is cooled by a heat exchanger 10, whereby the gas temperature in the discharge tube 1 is maintained at a temperature lower than a predetermined value.

In such conventional apparatus the power source frequency must be at least 20 or 30 KHz in order to obtain the high discharge density necessary for performing efficient laser oscillation. Such high frequencies are disadvantageous, however, in that the conversion efficiency of the power source is reduced and the manufacturing costs are high.

Furthermore, with such a conventional arrangement the discharge density distribution in the tube 1 has a planar symmetry along the center plane C as shown in FIG. 2(a), which makes it difficult to obtain a high discharge density.

FIG. 2(b) shows a typical operating curve for a single phase discharge of the prior art; the relationship between the high frequency voltage $V_{12}$ applied across the electrodes and the discharge period. As may be seen the discharge period is intermittent, which further reduces the overall discharge density.

SUMMARY OF THE INVENTION

Accordingly, an object of this invention is to improve the conversion efficiency of the power source, and to reduce manufacturing costs. Another object is to arrange the electrodes to obtain a discharge which is in axial symmetry with the laser radiation axis and which has a high center density, whereby single mode laser oscillation is carried out efficiently. A further object is to increase the discharge density by achieving a continuous discharge.

These objects are accomplished by providing a silent discharge type of gas laser apparatus having three or more electrodes arranged in axial symmetry with respect to the laser radiation axis. A high frequency power source having three or more phases generates a multi-phase voltage which is applied across the electrodes.

DETAILED DESCRIPTION OF THE PREFERRED EMBODIMENTS

Figure 1:
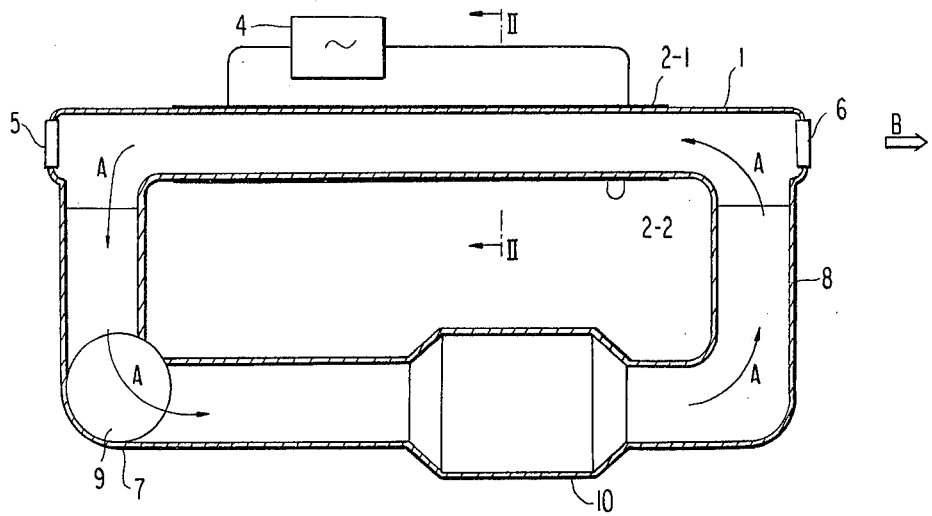
FIG. 1 shows a vertical cross-sectional view of a conventional silent discharge type of gas laser apparatus.
Figure 2A:
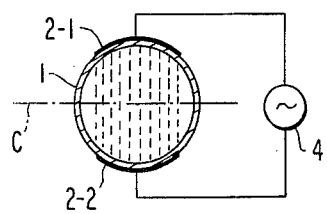
FIG. 2(a) shows a cross-sectional view taken along line II—II of FIG. 1.
Figure 2B:
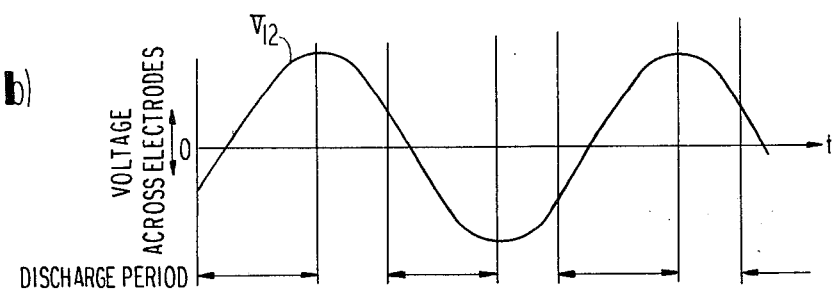
FIG. 2(b) shows the operating curve for the conventional laser apparatus shown in FIG. 1.
Figure 3A:
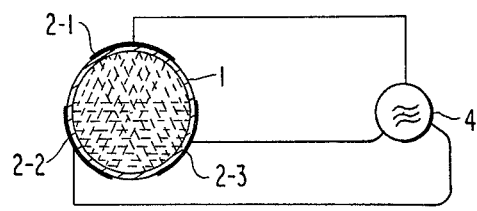
FIG. 3(a) shows a cross-sectional view of an embodiment of this invention.
Figure 3B:
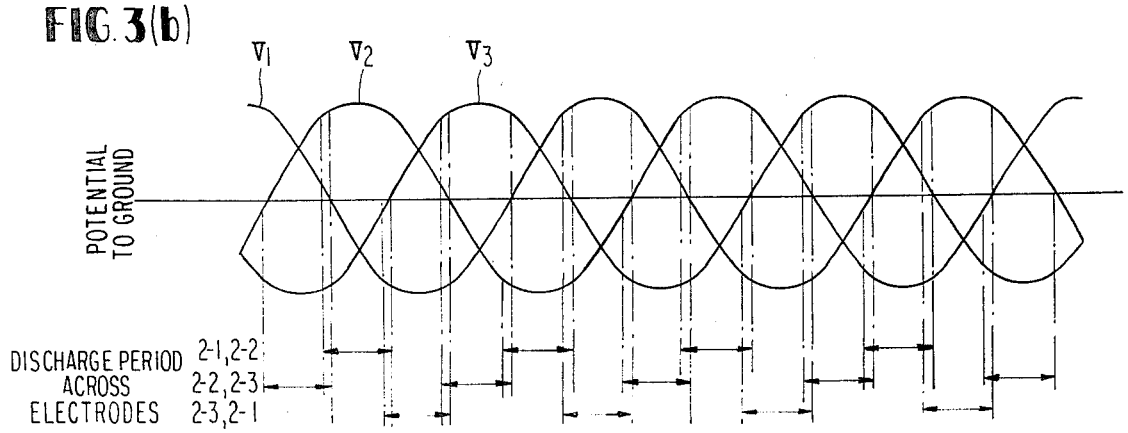
FIG. 3(b) shows the operating curve for the laser apparatus of FIG. 3(a)

In the three phase discharge embodiment of the invention shown in FIG. 3(a), three identically shaped electrodes 2-1, 2-2 and 2-3 are axially and symmetrically arranged in contact with the outer surface of a dielectric discharge tube 1. A three phase high frequency electric power source 4 supplies high frequency voltage in three symmetrical phases, as shown in FIG. 3(b), to the electrodes. The axis of the discharge tube corresponds with that of the laser radiation.

In FIG. 3(b) curves $V_1$, $V_2$ and $V_3$ represent respectively the potential to ground of the electrodes 2-1, 2-2 and 2-3. The instantaneous voltage between each pair of electrodes is determined by the potential difference across them, and during the periods in which this voltage exceeds the discharge threshold a discharge occurs between the electrodes. The slightly overlapping periods of discharge between the electrodes are clearly shown in FIG. 3(b).

Since the discharge, as may be seen from FIGS. 3(a) and 3(b), moves in sequence in a rotating manner, the discharge density distribution will be almost axially symmetrical with the density in the center portion of the tube 1 being higher than in the surrounding circumferential areas.

In such three phase operation, the discharge density in the tube is increased to 1.5 to 3 times that of conventional single phase discharge under the same conditions of voltage and frequency (although it will differ according to voltage wave shape, voltage peak value, etc.). Accordingly, the frequency necessary to obtain a predetermined discharge density is considerably lower than with single phase discharge. Such frequency reduction makes it possible to increase the conversion efficiency of the power source and to reduce manufacturing costs.

Figure 4A:
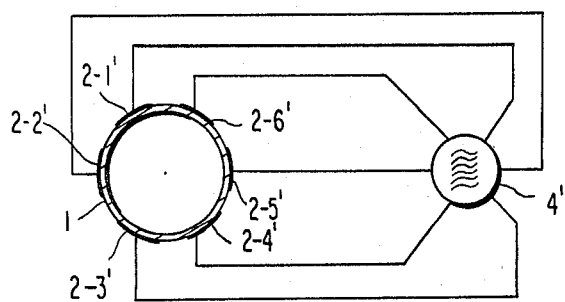
FIG. 4(a) shows a cross-sectional view of another embodiment of the invention.
Figure 4B:
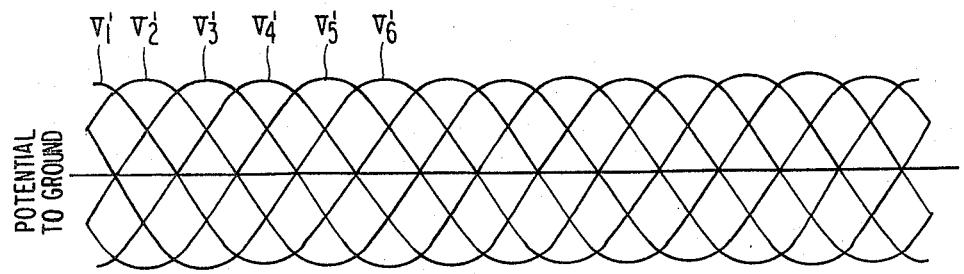
FIG. 4(b) shows the operating curve for the laser apparatus of FIG. 4(a)

In the six phase discharge embodiment of the invention shown in FIG. 4(a), six identically shaped electrodes 2-1' through 2-6' are axially and symmetrically arranged in contact with the outer surface of a dielectric discharge tube 1. A six phase high frequency power source 4' supplies high frequency voltage in six symmetrical phases $V_1$-$V_6$, as shown in FIG. 4(b), to the electrodes. The discharge density increase is similar to that achieved with a three phase discharge, but the degree of axial symmetry is further improved.

Figure 5:
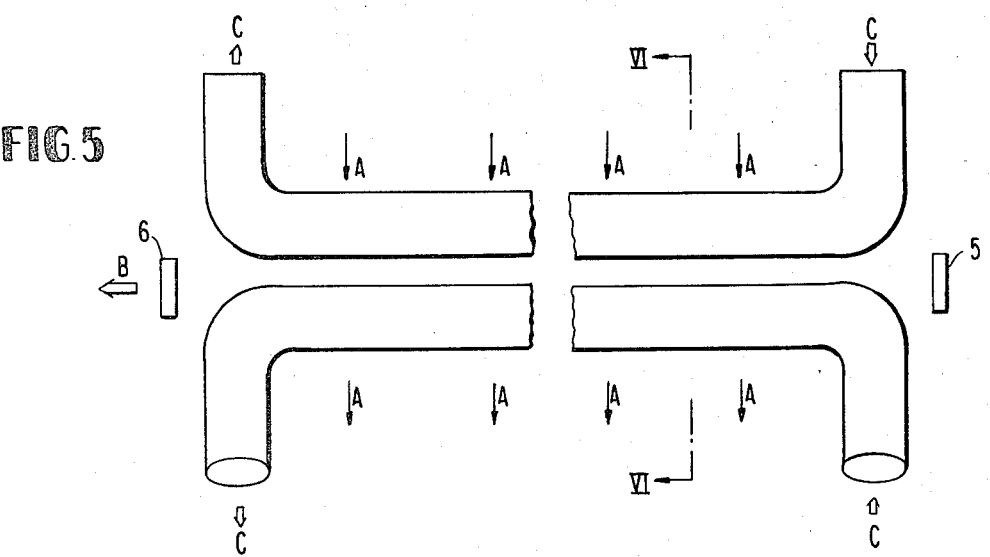
FIG. 5 shows a partial side view of a further embodiment of the invention.
Figure 6:
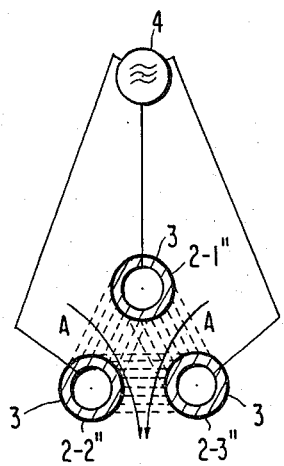
FIG. 6 shows a cross-sectional view taken along line VI—VI of FIG. 5.

FIG. 5 shows a partial side view of a discharge electrode arrangement according to another embodiment of the invention, which is applied to a $CO_2$ laser apparatus of the type in which the gas flows in a direction perpendicular to the axis of laser radiation—as opposed to the parallel flow apparatuses shown in FIGS. 1 through 4. FIG. 6 shows a cross-sectional view of the embodiment shown in FIG. 5. Metal tube electrodes 2-1'' through 2-3'' have their outer surfaces covered with a dielectric material 3. The electrodes are arranged in parallel with each other and in axial symmetry such that they are each the same distance from the laser radiation axis, and the respective distances between them are equal. The electrode tubes are cooled by a dielectric fluid flowing through them in the direction of arrow C. The total reflector 5 and the partial reflector 6 are disposed along the axial direction of the electrode tubes, and the light resonator is composed of these reflectors. The gas flows in a direction perpendicular to the electrode tube axes and the laser radiation axis, as indicated by the arrows A in FIG. 5. The remainder of this embodiment is similar to the parallel flow type laser apparatus in that the gas is circulated by a blower (not shown), and is cooled by a heat exchanger (not shown).

The three phase power source 4 supplies high frequency voltage in three symmetrical phases to the electrodes 2-1'', 2-2'' and 2-3''. By employing three phase voltages the discharge density and the degree of axial symmetry is increased, as in the embodiment shown in FIGS. 3(a) and 3(b).

Although the multi-phase discharge concept of the invention is not limited to three or six phases, three phases are somewhat easier to adopt from the point of view of manufacturing high frequency power sources, and are very effective and useful in practice. Six phases can be easily obtained from a three phase high frequency power source, if desired, by employing a transformer to effect polarity conversion.

What is claimed is:

1. A silent discharge gas laser apparatus, comprising:
    (a) means defining a laser resonator,
    (b) means for establishing a flow of gas in said resonator,
    (c) at least three electrodes arranged in axial symmetry with respect to a laser radiation axis of said resonator,
    (d) a multi-phase high frequency power source for generating voltage signals of at least three phases, and
    (e) means for applying said voltage signals across the electrodes.

2. An apparatus according to claim 1 wherein the electrodes are identically shaped.

3. An apparatus according to claim 1 wherein the power source supplies voltage signals to the respective electrodes in sequence such that a rotating discharge is established.

4. An apparatus according to claims 1, 2 or 3 wherein the number of the electrodes and the number of phases of the power source are equal.

5. A silent discharge gas laser apparatus, comprising:
    (a) a discharge tube made of a dielectric material and defining a discharge zone therewithin,
    (b) means for establishing a flow of gas in said discharge tube,
    (c) at least three electrodes disposed on an outer wall of the discharge tube in axial symmetry therewith,
    (d) a multi-phase high frequency power source for generating voltage signals of at least three phases, and
    (e) means for applying said voltage signals across the electrodes.

6. An apparatus according to claim 5 wherein the discharge tube axis and a laser radiation axis coincide.

7. An apparatus according to claims 5 or 6 wherein there are six electrodes disposed in axial symmetry on the outer wall of the discharge tube, and the power source is a six phase high frequency power source.

8. A silent discharge gas laser apparatus, comprising:
    (a) at least three electrode tubes arranged in axial symmetry with respect to an axis of laser radiation,
    (b) dielectric material covering said tubes,
    (c) means for establishing a flow of gas in a resonance zone between said tubes,
    (d) a multi-phase high frequency power source for generating voltage signals of at least three phases, and
    (e) means for applying said voltage signals across the electrode tubes.

9. An apparatus according to claim 8 wherein a dielectric cooling medium is circulated through the electrode tubes.

10. An apparatus according to claim 9 wherein the electrode tubes are arranged in parallel with the axis of laser radiation, are each equidistant from said axis, and are each equidistant from each other.

11. An apparatus according to claims 8, 9 or 10 wherein there are six electrode tubes arranged in axial symmetry with the laser radiation axis, and the power source is a six phase high frequency power source.

* * * * *